Patented July 15, 1924.

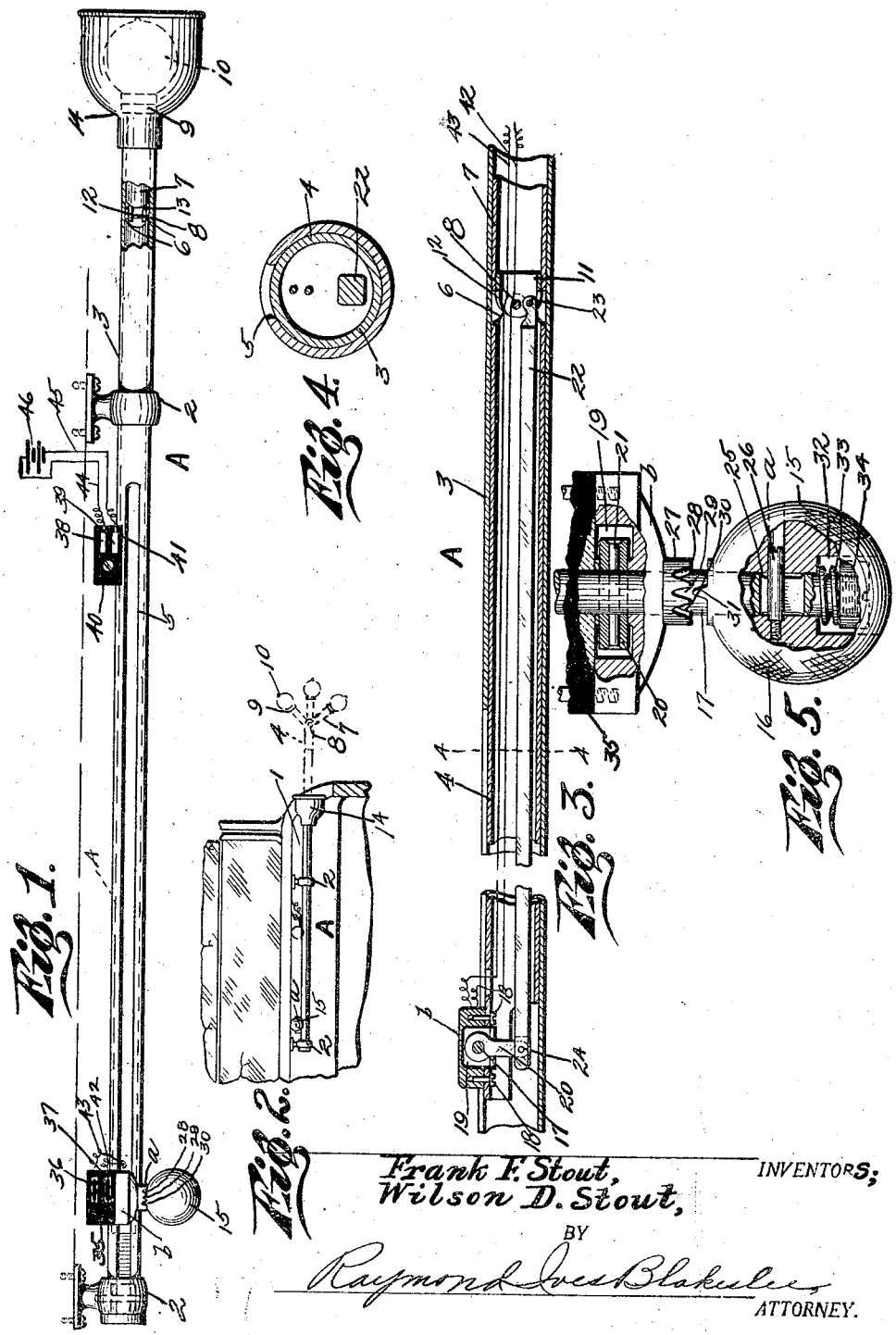

1,501,377

UNITED STATES PATENT OFFICE.

WILSON D. STOUT AND FRANK F. STOUT, OF LOS ANGELES, CALIFORNIA.

VEHICLE SIGNAL.

Application filed June 21, 1921. Serial No. 479,418.

*To all whom it may concern:*

Be it known that we, WILSON D. STOUT and FRANK F. STOUT, citizens of the United States, residing at Los Angeles, in the county of Los Angeles and State of California, have invented new and useful Improvements in Vehicle Signals, of which the following is a specification.

This invention relates to vehicle signals, and more particularly to signals for use in conjunction with the operation of motor vehicles, and in certain aspects and particulars and features it constitutes an improvement upon or departure from the invention disclosed in Letters Patent No. 1,270,563, issued to us jointly June 25, 1918, for direction signal for motor vehicles.

In accordance with the present invention we employ a single slidable tube mounted within the casing and provided at one end with a signal light and signal light mounting, such light and its mounting being adapted to be projected beyond one end of the casing, means being provided for projecting and retracting the signal light and mounting and for manipulating the same into several positions to indicate respectively that the vehicle is about to stop, turn to the left, turn to the right, or execute such other movement as may be related to a particular set or disposition of the signal. Means are also provided for illuminating the signal light, such means being controlled in the projection or retraction of the tube, whereby the signal light is displayed when in projected position, and put out of operation when in retracted position.

The invention has for other and further objects the provision of an improved vehicle signal of the general character stated, which will be superior in point of relative simplicity and inexpensiveness of construction, taken in connection with compactness in form, sightliness in appearance, convenience and facility in application to or detachment from the vehicle, and convenience in use and manipulation, and which will be generally superior in effectiveness and efficiency.

With the above and other objects in view, the invention consisting in the novel and useful provision, formation, construction, combination, association and relative arrangement and mode of operation of parts, members and features, all as hereinafter described, shown in the drawing, and finally pointed out in claims.

In the drawing:

Figure 1 is a top plan view of our improved signal member, parts being fragmentary and cross-sectioned to illustrate certain details of construction;

Figure 2 is a fragmentary view showing the method of attachment of our improved signal mounted in connection with the instrument board of a motor vehicle;

Figure 3 is a fragmentary longitudinal cross sectional view of the signal member shown in Figure 1 and showing details of construction;

Figure 4 is a cross sectional view of the signal member shown in Figure 3, and taken on the line 4—4, Figure 3; and Figure 5 is a fragmentary plan view, certain parts being sectioned, of means utilized for extending or retracting the signal member into position of observance and for turning the signal member into a plurality of positions.

Corresponding parts in all the figures are designated by the same reference characters.

Referring now with particularity to the drawing the improved signal may be designated in its entirety by A, which improved signal member A may be mounted in connection with the instrument board 1 of a motor vehicle, as shown in Figure 2, as by means of ring brackets 2 carrying said signal member and joined with the instrument board. The signal member A includes a tubular outer casing 3 with the ring bracket members 2 joined to said tubular member 3 at spaced points. Concentric within the tubular casing 3 is a further tubular member 4, which is adapted to be extended or retracted within the tubular casing 3. To accomplish the extension and retraction of the tubular member 4, we slot the tubular casing 3 longitudinally, as shown at 5. An operating means *a* externally of the tubular casing 3 passes through the slot 5 and engages with the tubular member 4.

As stated, this invention contemplates extending or retracting the signal member from the casing 3 and then adjusting the signal member in any one of a plurality of positions by the operating means *a* so as to indicate turning directions of the vehicle or that the vehicle is about to stop. To accomplish this desirable result I provide the tubular member 4 with two diametrically opposed ear members 6, to which ear members is pivotally joined a further tubular member 7, as shown at 8. The tubular member 7 is provided with an electric socket 9 at its outer extremity and an incandescent bulb 10 is adapted to be received within said socket. In the construction shown, it will be observed that the pivotal connection between the tubular member 7 and the tubular member 4 may be accomplished by providing the tubular member with a tubular inset 11 having projecting portions in the form of ears, as shown at 12 and 13.

In Figure 1 the tubular casing 3 is provided at its outer extremity with a guard 14, which guard is adapted to house the bulb or signal member proper, 10, when the signal member is in a retracted position. Obviously if the operating means $a$ were moved, so as to extend the signal member from the tubular casing 3, the tubular member 7 would drop downwardly with relation to the tubular member 4. To prevent this we so arrange the operating means $a$ that the position the tubular member 7 assumes with relation to the tubular member 4, may be regulated at the will of the operator. The operating means $a$ includes a handle member 15 which may be of any form or shape. In Figure 5 the handle 15 is shown as being round and the surface thereof may be roughened as shown at 16 to provide a firm grip for the hand of the operator. The handle member 15 is mounted upon the shaft 17, which shaft in turn is rotatably received within a member $b$. The member $b$ is really a rider, which fits through the slot 5 and is joined with the tubular member 4 as by screws 18. It will be noted upon reference to Figures 3 and 5 that the member $b$ is recessed as at 19 and that a crank member 20 carried by the shaft 17 is accommodated within said recessed portion 19. The shaft 17 is prevented from being removed from the member $b$ by the crank member 20 having a pin 21 passing through said crank and the shaft. This means securely locks the crank to the shaft so that the crank will rotate upon rotation of the shaft. A link member 22 extends within the tubular member 4 and has one of its ends pivotally joined as at 23 to the stud or ear 12 and in eccentric relation to the pivotal connection that exists between the tubular member 7 and the tubular member 4. The opposite end of the link 22 is pivotally joined to the crank as at 24.

The shaft 17 is transversely slotted as at 25 and a pin 26 having a screw threaded engagement with the handle 15 is adapted to pass through said slot 25 so as to maintain the handle 15 to said shaft and so that the shaft 17 may be rocked back and forth, depending upon a turning of the handle 15. Obviously, a turning of the handle 15 will move the crank 20 so that the link member 22 and the tubular member 7 will likewise be moved when the tubular member 7 is projected beyond the casing 3. In Figure 2 in dotted lines, we have shown the extremity of the signal member carrying the light 10 in three positions. It is necessary or highly expedient that some means be provided whereby the signal member or light 10 may be held in any one of the said positions shown in Figure 2. To accomplish this result we provide a collar 27 attached to the rider $b$, which rider is provided with three notched portions as 28, 29 and 30. We likewise provide the handle member 15 with a stud 31 adapted to enter in one of the recesses 28, 29 or 30. This provision of the stud with recesses obviously allows the operator to adjust the signal member into any one of the positions shown in Figure 2 and to maintain the signal member in such position. The handle 15 might jar so that the stud 31 would be released from one of notches, and to overcome this fault, I recess the handle 15 as at 32. The shaft 17 extends into said recess and a coil spring 33 surrounds said shaft and has one end thereof in engagement with the bottom wall of the recess, the opposite end of the coil spring 33 bearing against a nut 34 having a screw-threaded engagement with the end of the shaft 17. The coil spring 33 acts as a compression member and forces the handle 15 inwardly at all times, due to the expansion of the spring so that the stud 31 will engage and be maintained within one of the notches of the member 27. Obviously the first action on the part of the operator desiring to use this signal, would be to pull the handle member 15 so that the spring 33 would be compressed, the slot 25 permitting this movement, whereupon the handle 15 may be rotated one direction or the other to move the signal member 10 to the position desired, then releasing the handle 15 so that the stud 31 will engage certain of the notches of the member 27 to maintain the signal member 10 in a desired position. The handle member may be used likewise to slide the signal member outward from the tubular casing 3 so that the signal member 10 may be readily seen, as is illustrated in Figure 2. It is of course obvious that until the tubular member 7 has been extended a sufficient distance outwardly from the tubular casing 3, the signal member 10 could not be moved upwardly or downwardly.

If the signal member 10 is electrically operated we provide an insulating plate 35 carried by the rider $b$, which insulating plate carries two contact fingers 36 and 37. These contact fingers 36 and 37 are adapted to engage further contact fingers 38 and 39 carried by an insulating plate 40, which is joined with the tubular casing 3 as at 41. Two electrical conducting members 42 and 43 connect with the socket member 9 and with the fingers 36 and 37. The fingers 38 and 39 have electrical conducting members 44 and 45 joined therewith, said electrical conducting members leading to a source of current supply as illustrated at 46. Now, when the fingers 36 and 37 contact with the fingers 38 and 39 an electrical circuit is completed and the signal 10 will be illuminated.

It is obvious that many changes and modifications and variations may be made in departure from the foregoing description, all without departing from the true spirit of the invention.

Having thus disclosed our invention, we claim and desire to secure by Letters Patent:

1. A device of the character disclosed, comprising an elongated casing, a tubular member slidably mounted within the casing, a signal member mounted in connection with the tubular member and adapted to be projected from and retracted within the casing, means for sliding the tubular member within the casing, and means for throwing the signal member into a plurality of positions when in projection from the casing to display corresponding signals.

2. A device of the character disclosed, comprising an elongated casing, a tubular member slidably mounted within the casing, a signal member mounted in connection with the tubular member and adapted to be projected from and retracted within the casing, means for sliding the tubular member within the casing, and means for throwing the signal member into a plurality of positions when in projection from the casing to display corresponding signals; said signal member being pivotally joined with said slidable tubular member.

3. A device of the character disclosed, comprising an elongated casing, a tubular member slidably mounted within the casing, a signal member mounted in connection with the tubular member and adapted to be projected from and retracted within the casing, means for sliding the tubular member within the casing, and means for throwing the signal member into a plurality of positions when in projection from the casing to display corresponding signals; said signal member being pivotally joined with said slidable tubular member; said means for sliding the tubular member comprising a handle, a crank operated by the handle, and a link between the crank and said pivotally mounted signal member.

4. A device of the character disclosed, comprising an elongated casing, a tubular member slidably mounted within the casing, a signal member mounted in connection with the tubular member and adapted to be projected from and retracted within the casing, means for sliding the tubular member within the casing, and means for throwing the signal member into a plurality of positions when in projection from the casing to display corresponding signals; said signal member being pivotally joined with said slidable tubular member; said means for sliding the tubular member comprising a handle, a crank operated by the handle, and a link between the crank and said pivotally mounted signal member; said casing being provided with an elongated slot, and said handle being provided with a shaft upon which said crank is mounted.

5. A device of the character disclosed, comprising an elongated casing, a tubular member slidably mounted within the casing, a signal member mounted in connection with the tubular member and adapted to be projected from and retracted within the casing, means for sliding the tubular member within the casing, and means for throwing the signal member into a plurality of positions when in projection from the casing to display corresponding signals; said signal member being pivotally joined with said slidable tubular member; said means for sliding the tubular member comprising a handle, said handle including a shaft, a crank connected with the shaft, and a hand-piece slidably mounted upon the shaft and provided with locking means whereby the hand-piece and shaft may be locked to hold said pivotally mounted signal member in signaling position.

6. A device of the character disclosed, comprising an elongated casing, a tubular member slidably mounted within the casing, a signal member mounted in connection with the tubular member and adapted to be projected from and retracted within the casing, means for sliding the tubular member within the casing, and means for throwing the signal member into a plurality of positions when in projection from the casing to display corresponding signals; said casing being provided with an enlargement at one end within which said signal member is in part chambered when retracted.

7. A device of the character disclosed, comprising a signaling member adapted to assume a plurality of predetermined positions and means for moving said signaling member to said predetermined positions; said means comprising a handle provided with a shaft, a crank connected with the shaft, a link between the crank and signaling member, and an end piece slidably mounted upon the shaft and provided with locking means whereby the hand piece and shaft may be locked to hold said signaling member in signaling position.

8. A device of the character disclosed, comprising a signaling member adapted to assume a plurality of predetermined positions and means for moving said signaling member to said predetermined positions;

said means comprising a handle provided with a shaft, a crank, a link between the crank and signaling member, said crank being connected with the shaft and an end piece slidably mounted upon the shaft and provided with locking means whereby the end piece and shaft may be locked to hold said signaling member in signaling position; means further being provided for normally maintaining said locking means operative.

In testimony whereof, we have signed our names to this specification in the presence of two subscribing witnesses.

WILSON D. STOUT.
FRANK F. STOUT.

Witnesses:
J. CALVIN BROWN,
J. S. SHUTT.